United States Patent
Douglas et al.

(10) Patent No.: US 10,061,330 B2
(45) Date of Patent: Aug. 28, 2018

(54) HVAC SYSTEM HAVING A DIAGNOSTICS CONTROLLER ASSOCIATED THEREWITH

(71) Applicant: Lennox Industries Inc., Richardson, TX (US)

(72) Inventors: Jonathan Douglas, Richardson, TX (US); Herman M. Thomas, Richardson, TX (US)

(73) Assignee: Lennox Industries Inc., Richardson, TX (US)

( * ) Notice: Subject to any disclaimer, the term of this patent is extended or adjusted under 35 U.S.C. 154(b) by 1085 days.

(21) Appl. No.: 13/919,590

(22) Filed: Jun. 17, 2013

(65) Prior Publication Data
US 2013/0282186 A1    Oct. 24, 2013

Related U.S. Application Data

(63) Continuation-in-part of application No. 13/333,727, filed on Dec. 21, 2011, now abandoned.

(51) Int. Cl.
| | |
|---|---|
| *G05D 23/00* | (2006.01) |
| *F24F 11/30* | (2018.01) |
| *F24F 110/00* | (2018.01) |
| *F24F 110/30* | (2018.01) |
| *F24F 110/40* | (2018.01) |
| *F24F 140/40* | (2018.01) |
| *F24F 11/52* | (2018.01) |

(52) U.S. Cl.
CPC .............. *G05D 23/00* (2013.01); *F24F 11/30* (2018.01); *F24F 11/52* (2018.01); *F24F 2110/00* (2018.01); *F24F 2110/30* (2018.01); *F24F 2110/40* (2018.01); *F24F 2140/40* (2018.01)

(58) Field of Classification Search
CPC .................... G05D 23/00; F24F 11/001; F24F 2011/0056; F24F 2011/0042; F24F 2011/0038
See application file for complete search history.

(56) References Cited

U.S. PATENT DOCUMENTS

| | | | | |
|---|---|---|---|---|
| 3,342,211 A | * | 9/1967 | Johnson ................. | F16K 1/165 137/601.09 |
| 3,630,496 A | * | 12/1971 | Hurst ..................... | B01D 47/00 261/26 |
| 4,406,397 A | * | 9/1983 | Kamata ................... | F24F 3/048 165/208 |

(Continued)

OTHER PUBLICATIONS

*Canadian Intellectual Property Office*; Application No. 2,847,042, 4 pages, dated Apr. 24, 2015 and received May 15, 2015.

(Continued)

*Primary Examiner* — Kun Kai Ma
(74) *Attorney, Agent, or Firm* — Baker Botts L.L.P.

(57) ABSTRACT

In one aspect, the present disclosure provides a controller for a HVAC system having an economizer with a damper and pressure sensors on opposing sides of the economizer. The controller comprise a diagnostics controller having a program configured to use pressure difference sensor data to determine if a pressure difference across the economizer is outside an operational design parameter of the HVAC system, and generate an error signal when the pressure difference is outside the operational design parameter.

9 Claims, 3 Drawing Sheets

(56) References Cited

U.S. PATENT DOCUMENTS

| | | | | |
|---|---|---|---|---|
| 4,627,569 A | * | 12/1986 | Morris | F24F 3/0442 137/85 |
| 4,796,651 A | * | 1/1989 | Ginn | G01F 1/22 137/487 |
| 4,841,733 A | | 6/1989 | Dussault et al. | |
| 5,447,037 A | * | 9/1995 | Bishop | F24F 3/044 165/251 |
| 5,518,446 A | * | 5/1996 | Jacob | B08B 15/023 137/486 |
| 5,535,082 A | * | 7/1996 | Botti | H03F 1/305 361/18 |
| 5,597,354 A | * | 1/1997 | Janu | F24F 11/0009 454/229 |
| 5,791,408 A | * | 8/1998 | Seem | F24F 11/0076 165/248 |
| 5,863,246 A | * | 1/1999 | Bujak, Jr. | F24F 3/0442 165/212 |
| 6,129,113 A | * | 10/2000 | Van Becelaere | F16K 1/165 137/557 |
| 6,296,193 B1 | * | 10/2001 | West | F24F 3/044 236/1 B |
| 2003/0192331 A1 | * | 10/2003 | Alford | F24F 3/1405 62/173 |
| 2004/0074279 A1 | * | 4/2004 | Forrest | G01N 33/0006 73/1.06 |
| 2004/0236472 A1 | * | 11/2004 | Junk | F15B 5/006 700/282 |
| 2005/0125102 A1 | * | 6/2005 | Nichols | F24F 11/0086 700/276 |
| 2005/0224591 A1 | * | 10/2005 | Wolfson | F24F 11/0001 236/49.3 |
| 2006/0150644 A1 | * | 7/2006 | Wruck | F24F 11/0017 62/126 |
| 2007/0060039 A1 | * | 3/2007 | Cook | F16K 1/165 454/255 |
| 2007/0218828 A1 | | 9/2007 | Baik | |
| 2010/0198411 A1 | * | 8/2010 | Wolfson | G05B 15/02 700/275 |
| 2011/0068913 A1 | * | 3/2011 | Bechtler | B60T 8/885 340/506 |
| 2011/0172831 A1 | * | 7/2011 | Kreft | F24F 3/044 700/278 |
| 2013/0014560 A1 | * | 1/2013 | Wei | G01N 1/2252 73/23.31 |
| 2013/0090769 A1 | * | 4/2013 | McKie | F24F 11/006 700/277 |
| 2013/0161403 A1 | | 6/2013 | Douglas et al. | |

OTHER PUBLICATIONS

European Search Report dated Dec. 15, 2014, Applicant: Lennox Industries Inc., 7 pages.

European Patent Office, Communication pursuant to Article 94(3) EPC, Application No. 14160363.9, dated Sep. 18, 2017, 3 pages.

* cited by examiner

HVAC SYSTEM HAVING A DIAGNOSTICS CONTROLLER ASSOCIATED THEREWITH

CROSS-REFERENCED APPLICATION

This application is a continuation-in-part of pending U.S. patent application Ser. No. 13/333,727, filed Dec. 21, 2011, which is incorporated herein by reference, in its entirety.

TECHNICAL FIELD

This application is directed, in general, to heating, ventilating and air conditioning (HVAC) systems, and more specifically, to a diagnostics controller that can be used in those HVAC systems.

BACKGROUND

HVAC systems can be used to regulate the environment within an enclosed space. Typically, an air blower is used to pull air (i.e., return air) from the enclosed space into the HVAC system through ducts and push the air (i.e., return air) back into the enclosed space through additional ducts after conditioning the air (e.g., heating, cooling or dehumidifying the air). Various types of HVAC systems may be used to provide conditioned air for enclosed spaces. For example, some HVAC units are located on the rooftop of a commercial building. These so-called rooftop units, or RTUs, typically include one or more blowers and heat exchangers to heat and/or cool the building, and baffles to control the flow of air within the RTU. Some RTUs also include an air-side economizer that allows selectively providing fresh outside air (i.e., ventilation or ventilating air) to the RTU or to recirculate exhaust air from the building back through the RTU to be cooled or heated again. A pressure sensor that has sensors on opposite sides of the economizer is often present to provide pressure information within the air-side of the RTU.

SUMMARY

In one embodiment, the present disclosure provides a controller for a HVAC system having an economizer with a damper and pressure sensors on opposing sides of the economizer. The controller comprises a diagnostics controller having a program configured to use pressure difference sensor data to determine if a pressure difference across the economizer is outside an operational design parameter of the HVAC system, and generate an error signal when the pressure difference is outside the operational design parameter.

In yet another aspect, an HVAC system is disclosed. In one embodiment, the HVAC system comprises an economizer having a damper and an actuator to move the blades of the economizer, a pressure sensor configured to determine a pressure difference across the damper, and a diagnostics controller. The diagnostics controller has a program stored thereon that is configured to use the pressure difference sensor data to determine if a pressure difference across the economizer is outside an operational design parameter of the HVAC system, and generate an error signal when the pressure difference is outside the design parameter.

In another aspect, a computer program product, including a non-transitory computer usable medium having a computer readable program code embodied therein, the computer readable program code is adapted to be executed to implement a method of using pressure difference sensor data to determine if a pressure difference across an economizer of a HVAC system is outside an operational design parameter of the HVAC system, and generate an error signal when the pressure difference is outside the operational design parameter. The method comprises receiving pressure sensor feedback data from the HVAC system, wherein the feedback data corresponds to a pressure difference across an economizer of the HVAC system at a given damper blade position, comparing the feedback data to a diagnostics data table of the computer readable program, determining if the pressure difference is outside the operational design parameter, and sending an error signal when the pressure difference is outside of the operational design parameter.

BRIEF DESCRIPTION OF THE DRAWINGS

Reference is now made to the following descriptions taken in conjunction with the accompanying drawings, in which.

DETAILED DESCRIPTION

Knowing the ventilation airflow rate (i.e., airflow rate through the damper of the economizer) during the various operating modes of an economizer, such as the ventilation mode and the free cooling mode, is advantageous. When in the ventilation mode, the ventilation airflow rate provides verification that ventilation, as required, is being provided. If the ventilation airflow rate is too high, then energy may be wasted due to over ventilation. In a free cooling mode, knowing the ventilation airflow rate provides an indication of the energy savings provided by the economizer. Thus, determining the ventilation airflow of an HVAC system is often needed to verify that the system is providing the desired ventilation.

However, such systems may also rely on pressure sensors to monitor the ventilation airflow. Over time, these sensors or other components, such as the dampers in an economizer, within the ventilation system can malfunction and give false pressure readings or filters may become excessively dirty, thereby impending good airflow. Further, the actuator that drives the blades' positions of the economizer can also malfunction. In one embodiment, the present disclosure uses pressure sensor data to detect faults within the HVAC system. In another embodiment, the controller uses pressure sensor data in conjunction with damper positions of an economizer to detect faults within the HVAC system. Thus, embodiments of the present disclosure provide a diagnostic controller for an airside economizer using a pressure sensor. For example, the relationship between the damper position and the pressure sensor reading can be used to determine if the pressure sensor is operating correctly, or if the damper blades of the economizer are moving properly or if a duct is unduly restricted due to a dirty filter, etc.

Figure 1:
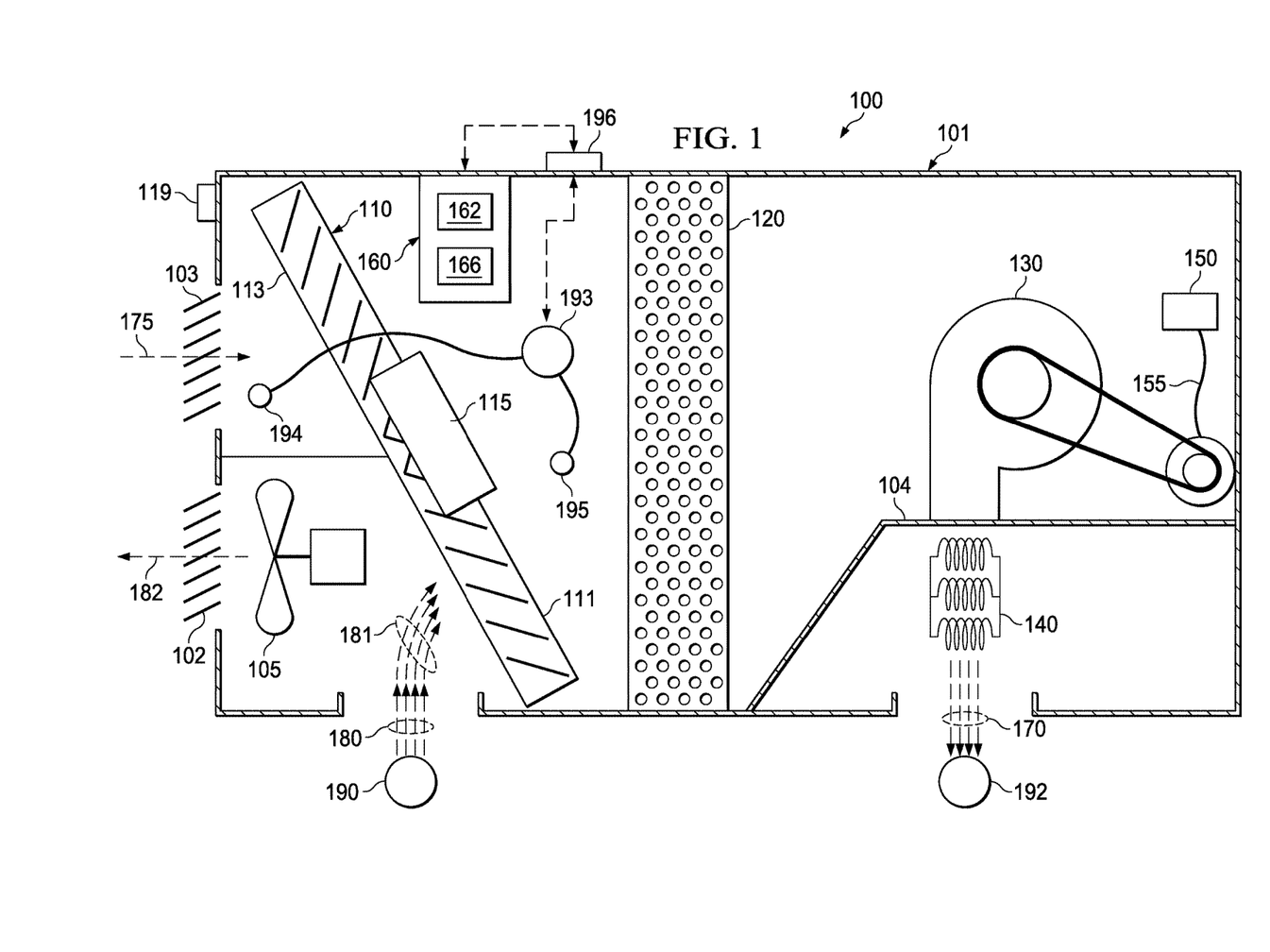
FIG. 1 illustrates a block diagram of an embodiment of an HVAC system constructed according to the principles of the disclosure.

FIG. 1 illustrates a block diagram of an embodiment of an HVAC system 100 constructed according to the principles of this disclosure. The system 100 includes an enclosure 101 (e.g., a cabinet) with openings for exhaust air, ventilation air, return air and supply air. The enclosure 101 includes exhaust vents 102 and ventilation vents 103 at the corresponding exhaust air and ventilation air openings. Within the enclosure 101, the system 100 includes an optional exhaust fan 105, economizer 110, a cooling element 120, an indoor fan or blower 130 and a heating element 140. Additionally, the system 100 includes a fan controller 150 and a HVAC controller 160. The fan controller 150 is coupled to the blower 130 via a cable 155. The cable 155 is a conventional cable used with HVAC systems. The HVAC controller 160 can be connected (not illustrated) to various components of the system 100, including a thermostat 119 for determining outside air temperature, via wireless or hardwired connections for communicating data. Conventional cabling or wireless communications systems may be employed. Also included within the enclosure 101 is a partition 104 that supports the blower 130 and provides a separate heating section.

In the embodiment that is illustrated, the HVAC system 100 is an RTU. One skilled in the art will understand that the system 100 can include other partitions or components that are typically included within an HVAC system, such as a RTU. While the embodiment of the system 100 is discussed in the context of a RTU, the scope of the disclosure includes other HVAC applications that are not roof-top mounted.

The blower 130 operates to force an air stream 170 into a structure, such as a building, being conditioned via an unreferenced supply duct. A return airstream 180 from the building enters the system 100 at an unreferenced return duct.

A first portion 181 of the air stream 180 re-circulates through the economizer 110 and joins the air stream 170 to provide supply air to the building. A second portion of the air stream 180 is air stream 182 that is removed from the system 100 via the optional exhaust fan 105.

The economizer 110 operates to vent a portion of the return air 180 and replace the vented portion with the air stream 175. Thus, indoor air quality characteristics, such as $CO_2$ concentration and humidity, may be maintained within defined limits within the building being conditioned. The economizer 110 includes damper, such as an indoor damper 111, an outdoor damper 113 and an actuator 115 that drives (opens and closes) the indoor and outdoor dampers 111, 113 (i.e., the blades of the indoor and outdoor dampers 111, 113). Though the economizer 110 includes two damper assemblies, one skilled in the art will understand that the concepts of the disclosure also apply to those economizers or devices having just a single damper assembly.

The controller 160 includes an interface 162 and a ventilation director 166. The ventilation director 166 may be implemented on a processor and/or a memory of the controller 160. The interface 162 receives feedback data from sensors and components of the system 100 and transmits control signals thereto. As such, the controller 160 may receive feedback data from, for example, the exhaust fan 105, the blower 130 and/or the fan controller 150, the economizer 110 and the thermostat 119, and transmit control signals thereto if applicable. One skilled in the art will understand that the location of the controller 160 can vary with respect to the HVAC system 100. The HVAC controller 160 is configured to determine supply airflow according to conventional means. For example, in one embodiment, the HVAC controller 160 is configured to calculate the supply airflow rate based on a set of blower curves, fan power and fan speed.

The interface 162 may be a conventional interface that employs a known protocol for communicating (i.e., transmitting and receiving) data. The interface 162 may be configured to receive both analog and digital data. The data may be received over wired, wireless or both types of communication mediums. In some embodiments, a communications bus may be employed to couple at least some of the various operating units to the interface 162. Though not illustrated, the interface 162 includes input terminals for receiving feedback data.

The feedback data received by the interface 162 includes data that corresponds to a pressure drop across the outdoor damper 113 and damper position of the economizer 110. In some embodiments, the feedback data also includes the supply airflow rate. Various sensors of the system 100 are used to provide this feedback data to the HVAC controller 160 via the interface 162. In some embodiments, a return pressure sensor 190 is positioned in the return air opening to provide a return static pressure. The return pressure sensor 190 measures the static pressure difference between the return duct and air outside of the HVAC system 100. In one embodiment, a supply pressure sensor 192 is also provided in the supply air opening to indicate a supply pressure to the HVAC controller 160. The supply pressure sensor 192 measures the static pressure difference between the return duct and the supply duct. Pressure sensor 193 is used to provide the pressure drop across outdoor damper 113 of the economizer 110. The pressure sensor 193 is a conventional pressure transducer that determines the static pressure difference across the outdoor damper 113. The pressure sensor 193 includes a first input 194 and a second input 195 for receiving the pressure on each side of the outdoor damper 113. The pressure sensors discussed herein can be conventional pressure sensors typically used in HVAC systems.

A diagnostics controller 196 is also present in the HVAC system 100 that is coupled to the pressure sensor 193 and the controller 160 that is configured to monitor the pressure sensor 193 and the economizer 110 and send an error signal when an improper pressure difference is read by the diagnostics controller 196, and in another embodiment, the controller 196 may also use a damper position of the economizer 110 in conjunction with the pressure sensor data to detect improper pressure differences. Though the pressure sensor 193 is shown as a separate component from the diagnostics controller 196, it should be understood that they may both be incorporated into a single unit. In one embodiment, the diagnostic controller 196 has a diagnostics table stored in memory. The values in the table are selected based on the airflow properties of the economizer damper assembly, which are known at time of manufacture.

It should be noted that the values in the diagnostics table may vary from unit to unit. For example, if the outdoor air inlet is relatively large and unrestricted, the minimum pressure when the damper is 100% open would be near zero. However, if the outdoor inlet is relatively small and restrictive, min pressure when 100% open could be 0.2" h2o. At the 0% open range of the table, the range of values are a function of the return static pressure drop, which is unknown. In another aspect of this embodiment, the pressure sensor 190 in the return duct could be used to narrow the range at 0% open. The pressure at the 50% open position is a function of the flow curves of the damper assembly.

Different values are obtained if the damper blades within the economizer 110 move opposed to each other vs. parallel to each other.

Economizer damper position data is provided to the HVAC controller 160 via the actuator 115 and the ventilation director 166. The actuator 115 is configured to rotate or move the indoor and outdoor dampers 111, 113, of the economizer 110 in response to a received signal, such as control signals from the HVAC controller 160 (i.e., the ventilation director 166). The actuator 115 is a conventional actuator, such as an electrical-mechanical device, that provides a signal that corresponds to the economizer damper position (i.e., blade angle of the outdoor damper 113 of the economizer 110). The signal is an electrical signal that is received by the ventilation director 166 which is configured to determine the relative angle of the outdoor damper 113 based on the signal from the actuator 115. A lookup table or chart may be used by the processor 117 to determine a relative blade angle with respect to an electrical signal received from the actuator 115. The angle can be based on (i.e., relative to) the ventilation opening of the HVAC system 100.

In some embodiments, the economizer damper position can be determined via other means. For example, an accelerometer coupled to a blade (or multiple accelerometers to multiple blades) of the outdoor damper 113 may be used to determine the economizer damper position. The outdoor damper 113 is opened at 100 percent when the blades thereof are positioned to provide maximum airflow of ventilation air 175 into the system 100 through the ventilation opening. In FIG. 1, the blades of the outdoor damper 113 would be perpendicular to the ventilation opening or the frame surrounding the ventilation opening when opened at 100 percent. In the illustrated embodiment, the blades of the outdoor damper 113 would be parallel to the ventilation opening when opened at zero percent.

Figure 3:
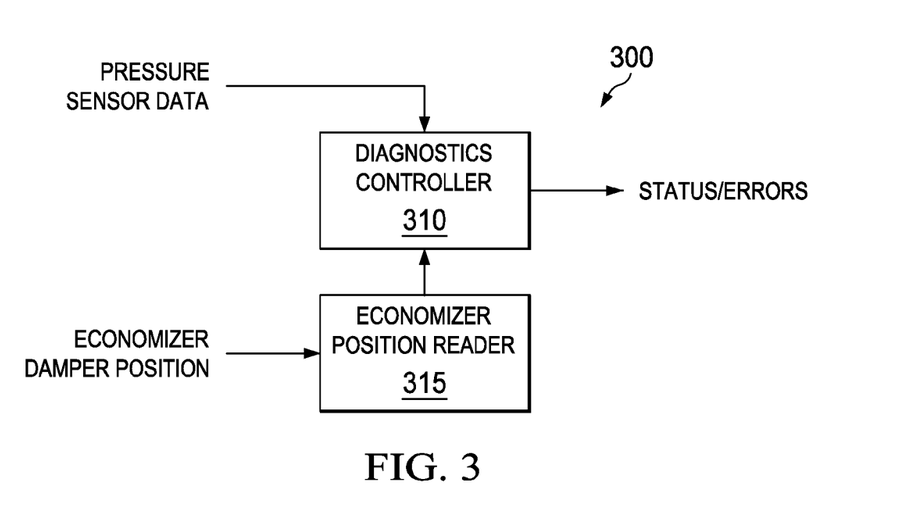
FIG. 3 illustrates a block diagram of an embodiment of the diagnostics controller, as provided by this disclosure.

The ventilation director 166 is configured to determine an operating ventilation airflow rate of the HVAC system based on the static pressure difference across the outdoor dampers 113, the economizer damper position and economizer ventilation data. In some embodiments, the ventilation director 166 also employs the supply airflow rate to calculate the operating ventilation airflow rate. In one embodiment, using the supply airflow rate for the calculation is based on the economizer damper position being above 50 percent. In one embodiment, the economizer ventilation data is developed during manufacturing or engineering of the system 100 or similar type of HVAC systems. During development, a ventilation airflow rate is measured in, for example, a laboratory, at a variety of operating conditions. Various sensors and/or other type of measuring devices are employed during the development to obtain the measured data for the various operating conditions. Economizer ventilation data is developed from the measured data and loaded into the HVAC controller 160, such as a memory thereof. During operation in the field, the HVAC controller 160 (i.e., the ventilation director 166) receives the feedback data and calculates the ventilation airflow rate employing the feedback data and the economizer ventilation data. FIG. 3 provides a more detailed embodiment of a ventilation director 166.

The ventilation director 166 may further be configured to adjust a position of the economizer 110 based on the economizer damper position and a desired ventilation airflow rate and provide damper position data to the diagnostics controller 196. The desired ventilation airflow rate can be preprogrammed into a memory of the HVAC controller 160 during manufacturing. In some embodiments, the desired ventilation airflow rate is entered into the HVAC controller 160 in the field during, for example, installation, a maintenance visit or a service visit. The ventilation director 166 generates a signal that directs the actuator 115 to adjust a position of the blades of the economizer 110 based on the desired ventilation airflow rate. In some embodiments, this signal represents a difference between the operating ventilation airflow rate and the desired ventilation airflow rate.

Figure 2:
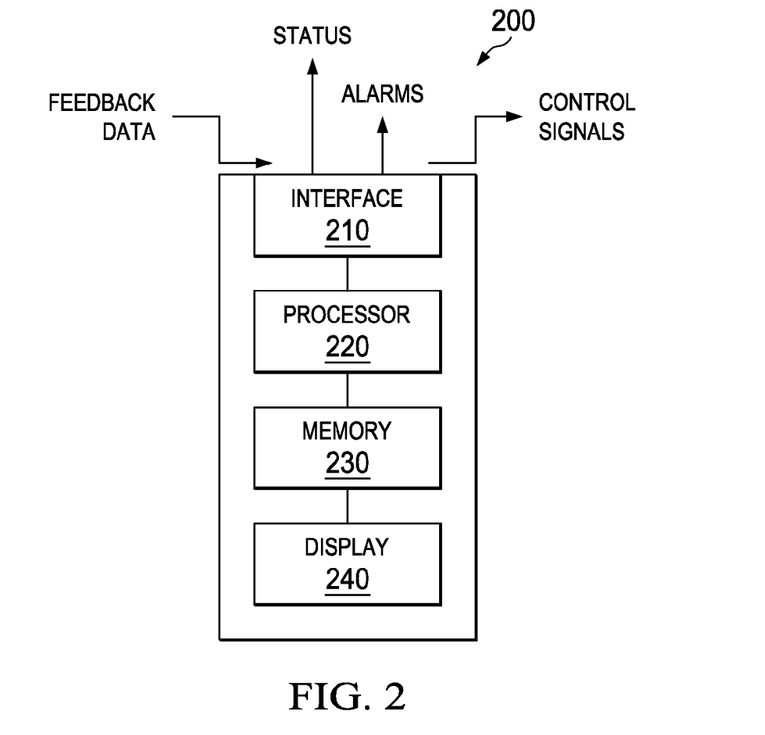
FIG. 2 illustrates a block diagram of one embodiment of a diagnostics controller, as provided by this disclosure.

FIG. 2 illustrates a block diagram of one embodiment of the diagnostics controller 200 (196 of FIG. 1). The controller 200 is configured to perform a diagnostics routine during system calibration, which occurs after installation and initial power-up, or during normal operation of the HVAC system 100, to determine if the pressure sensor is functioning properly or to determine if the damper blades of the economizer 110 are working properly based on pressure readings across the economizer 110. As such, the controller 200 is configured to generate diagnostic signals that may be transmitted to the controller 160. The controller 200 may generate the diagnostic signals in response to feedback data received from the pressure sensor 193. The controller 200 includes an interface 210 that is configured to receive and transmit the feedback data and diagnostic signals. The interface 210 may be a conventional interface that is used to communicate (i.e., receive and transmit, by either hard wire or wirelessly) data for a controller, such as a microcontroller.

The interface 210 may include a designated input terminal or input terminals that are configured to receive feedback data from the pressure sensor 193. The controller 200 also includes a processor 220 and a memory 230. The memory 230 may be a conventional memory typically located within a controller, such as a microcontroller, that is constructed to store data and computer programs. The memory 230 may store normal operating damper pressure differences as they relate to various damper positions of the economizer 110 and may also store diagnostic routines. The diagnostic routines may correspond to algorithms that provide the functionality of the diagnostic schemes disclosed herein. For example, the diagnostic routines may correspond to the algorithm or algorithms that implement the methods, as described below. The processor 220 may be a conventional processor, such as a microprocessor. The controller 200, in certain embodiments, may also include a display 240 for visually providing information to a user. The interface 210, processor 220 memory 230 and display 240 may be coupled together via conventional means to communicate information. The controller 200 may also include additional components typically included within a controller for a HVAC unit, such as a power supply or power port.

The controller 200 is configured to receive feedback data from the pressure sensor including, for example, a pressure difference across a damper of the economizer 110 of the HVAC system 100 based on a particular damper position. The controller 200 compares the pressure data received with normal pressure data stored in the controller 200. If the pressure reading is outside prescribed operating parameters, the diagnostics controller 200 will generate an error or alarm signal.

FIG. 3 illustrates a simple block diagram of an embodiment of a diagnostics controller 300, as provided herein. In one embodiment, the diagnostics controller 300 may be embodied as a series of operation instructions that direct the operation of a processor when initiated thereby. In one embodiment, the diagnostics controller 300 is implemented in at least a portion of a memory of an HVAC controller, such as a non-transitory computer readable medium of the HVAC controller. The diagnostics controller 300 includes a diagnostics controller 310 having a comparison table stored in memory and an economizer damper position reader 315.

The diagnostics controller 310 is configured to compare the pressure sensor data received from the pressure sensor with the stored table, based on the position of the damper positions of the economizer, which is provided by the economizer position read function 315. As stated above, the values in the table are selected based on the airflow properties of the economizer damper assembly, which are known at time of manufacture.

Figure 4:
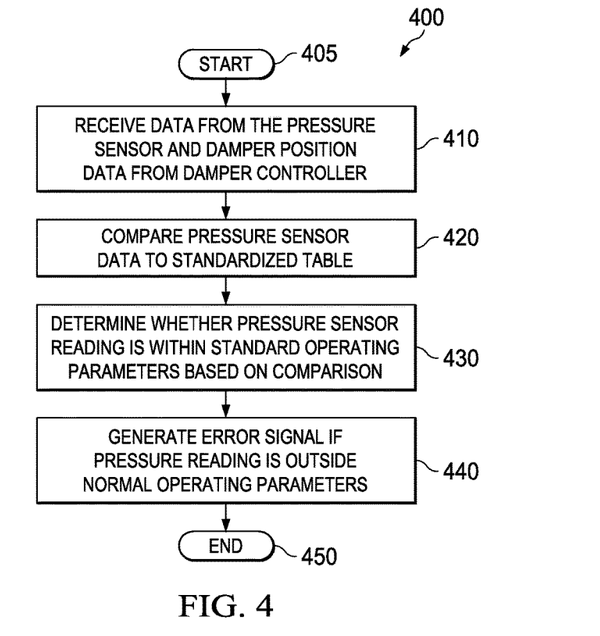
FIG. 4 illustrates a flow diagram of an embodiment of a method of diagnosing the operation of a HVAC system as provided by this disclosure.

FIG. 4 illustrates a flow diagram of an embodiment of a method 400 of diagnosing an HVAC unit based on pressure sensor data. The method 400 may be carried out under the direction of a computer program product. In one embodiment, a controller of an HVAC system is employed to carry out the method 400. The method 400 begins in a step 405.

In a step 410, pressure sensor data is received from the pressure sensor and damper position data from the damper or ventilation controller of the HVAC system. In one embodiment, the data corresponds to the pressure difference across an outdoor economizer damper and economizer damper position of the HVAC system. The data is real time data obtained during operation of the HVAC system, either during calibration or during continuous operation of the HVAC system.

The data is compared with standardized data within the memory of the diagnostics controller in a step 420. The controller then performs calculations to determine whether the pressure sensor reading is within standard operating parameters based on comparing the calculated pressure reading with the standardized pressure in step 430.

In a step 440, an error signal is generated if the pressure reading is outside the normal operating parameters. The method 500 ends in a step 450. For example, the error signal may be one or more of a duct restriction, an incorrect damper position, or a pressure sensor malfunction.

The above-described methods may be embodied in or performed by various conventional digital data processors, microprocessors or computing devices, wherein these devices are programmed or store executable programs of sequences of software instructions to perform one or more of the steps of the methods, e.g., steps of the method of FIG. 4. The software instructions of such programs may be encoded in machine-executable form on conventional digital data storage media that is non-transitory, e.g., magnetic or optical disks, random-access memory (RAM), magnetic hard disks, flash memories, and/or read-only memory (ROM), to enable various types of digital data processors or computing devices to perform one, multiple or all of the steps of one or more of the above-described methods, e.g., one or more of the steps of the method of FIG. 4. Additionally, an apparatus, such as dedicated HVAC controller, may be designed to include the necessary circuitry to perform each step of the methods disclosed herein.

Figure 5:
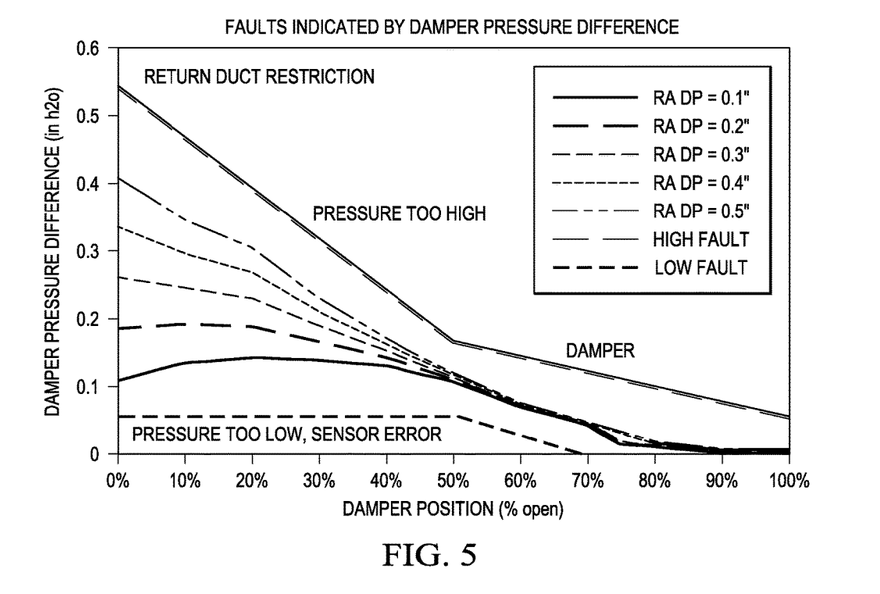
FIG. 5 illustrates a chart showing the relationship between damper position and damper position differences which the diagnostics controller uses to determine when the damper pressure difference is outside a preferred range of damper pressure differences.

As discussed above, embodiments of the diagnostics controller provided herein uses pressure difference sensor data across an economizer to detect faults with duct system, such as airflow restrictions, the economizer, or the pressure sensor itself. One embodiment of the diagnostics routine is based on the principles illustrated in FIG. 5 that shows a plot of the pressure drop across the damper as a function of damper position at varying return duct static pressures. Each line represents the damper pressure difference as a function of damper position for a given return duct static design pressure drop. The upper curve represents the pressure difference corresponding to a design return static of 0.5" which is the highest one should expect to see in the field. The bottom most curve represents the pressure difference corresponding to a damper static pressure drop on 0.1" which is the lowest typical return static. Areas outside the boundaries defined by these curves are unlikely to occur in a normally operating system. Thus, there appearance in a diagnostics routine could indicate a malfunction within the HVAC unit.

A high pressure and low pressure fault region is defined by high and low limits at closed, 50% open and full open. The red shaded regions on FIG. 5 indicate fault areas defined by the high and low fault limits. The fault limits 0.05" outside the expected pressure values to account for potential uncertainty in the pressure reading.

TABLE 1

Damper pressure 3 point fault curves

| Damper Position | Low Limit | High Limit |
|---|---|---|
| 0% | 0.05 | 0.60 |
| 50% | 0.05 | 0.25 |
| 100% | 0 | 0.20 |

The diagnostics algorithm can be used in at least two ways, during airflow calibration and continuously. During the airflow calibration procedure, the supply fan is commanded to run at a torque corresponding to 400 CFM per ton. The damper position is moved from closed to open. Pressure readings are taken at the closed, 50% open, and full open positions. They are then compared with the corresponding limits listed in Table 1, which is coded in the memory of the diagnostics controller. If the pressure is above the high limit and the damper position is less than 50% open, then a fault 1 condition is triggered, indicating that the damper pressure is too high. In such instances the alarm could instruct the technician to check the return for a restriction, such as a dirty filter, etc. If the pressure is above the high limit and the damper position is 50% or greater, then a fault 2 condition is triggered, indicating that the damper pressure is too high. In such instances, the alarm could instruct the technician to check the economizer damper. If the pressure is below the low limit, then a fault 3 condition is triggered, indicating that the damper pressure is too low. In such instances the alarm could instruct the technician to check the pressure sensor.

Anytime the fan is running, the function could be called to continuously monitor the status of the economizer damper. In one embodiment, during normal operation, the function uses a persistence criterion to ensure that a fault persists before triggering an error. During the supply fan calibration procedure, the persistence criteria is disabled to provide the installer immediate feedback regarding the installation. One embodiment of calibration involves the following steps:

Calculate the High and low limit using the following procedure to linearly interpolate high Low Limits. If the damper position is between 0 and 50%, then:

$$LowLimit = MinDPClosed + DamperPosition \times \frac{MinDP50\% - MinDPClosed}{50}$$

$$HighLimit = MaxDPClosed +$$

$$DamperPosition \times \frac{MaxDP50\% - MaxDPClosed}{50}$$

If the damper position greater than 50%, then:

$$LowLimit =$$

$$MinDP50\% + (DamperPosition - 50) \times \frac{MinDPOpen - MinDP50\%}{50}$$

$$HighLimit = MaxDPClosed +$$

$$(DamperPosition - 50) \times \frac{MaxDPOpen - MaxDP50\%}{50}$$

Correct the limits for airflow as follows:

The pressure limits listed in the table are based on full design airflow, which is typically 400 CFM/ton. At lower airflow rates the static pressure drops through the return ducts and damper drops with the square of the airflow rate. So, the pressure limits is corrected for the airflow rate, as follows.

$$LowLimit_{Corr} = LowLimit \times \left(\frac{CurrentAirflow}{NomCap \times 400}\right)^2$$

$$HighLimit_{Corr} = HighLimit \times \left(\frac{CurrentAirflow}{NomCap \times 400}\right)^2$$

Add uncertainty band to account for uncertainty in the pressure measurement. An addition error band is added to the limits to prevent false alarms as follows:

$$LowLimit_{final} = LowLimit_{Corr}$$

$$HighLimit_{final} = HighLimit_{Corr}$$

When the fan is on, the damper pressure reading is compared to the high and low final limit values. If the pressure is above the high limit and the damper position is less than 50% open, then a fault 1 condition is triggered, indicating that the damper pressure is too high. In such instances, the alarm could instruct the technician to check return restriction. If the pressure is above the high limit and the damper position is 50% or greater, then a fault 2 condition is triggered, indicating that the damper pressure is too high. In such instances the alarm could instruct the technician to check the economizer damper for proper operation. If the pressure is below the low limit, then a fault 2 condition is triggered, indicating that the damper pressure is too low. In such instances the alarm could instruct the technician to check the pressure sensor.

During calibration, faults are directly reported to the calibration function, and no persistence is required. During normal operation, a persistence criteria is typically met before the fault is reported. A separate instance of the persistence function is kept for each of the 3 faults, and a fault ratio of 5 is used for faults 1 and 3. In certain embodiment, the persistence routine may be active any time the fan is on and the damper position is less than 50%. For fault 2, the persistence routine may be active any time the fan is on and the damper position is less than 50%.

Those skilled in the art to which this application relates will appreciate that other and further additions, deletions, substitutions and modifications may be made to the described embodiments.

What is claimed is:

1. A controller for a heating, ventilating and cooling (HVAC) system having an economizer with a damper and pressure sensors on opposing sides of said economizer, comprising;
   a diagnostics controller having a program configured to:
      use pressure difference sensor data and damper position data of said economizer to determine if a pressure difference across said economizer of said HVAC system is outside an operational design parameter of said HVAC system, wherein said operational design parameter is a function of a damper position of said economizer, and
      generate an error signal indicating a return restriction problem when said pressure difference is outside said operational design parameter and said damper position is lower than a predetermined position, wherein said error signal specifies which one or more of the following conditions caused the return restriction problem: a duct restriction, an incorrect damper position, or a pressure sensor malfunction;
   wherein said diagnostics controller is configured with a stored diagnostics data table relating said pressure differences sensor data with said damper position data, and wherein said diagnostics controller is configured to:
      check pressure differences across said economizer at different damper positions during a continuous operation of said HVAC system, based on said stored diagnostics data table; and
      use a persistence criterion routine to ensure that a fault persists before triggering said error signal during said continuous operation of said HVAC system.

2. The controller in claim 1, wherein said diagnostics controller is configured to receive said damper position data from a HAVC system ventilation director.

3. The diagnostics controller recited in claim 1, wherein said diagnostics controller is configured to check pressure differences across said economizer at different damper positions during a calibration period of said HVAC system, based on said stored diagnostics data table.

4. The diagnostics controller recited in claim 1, wherein said stored diagnostics data table relates a damper position of 0%, 50%, and 100% to low limits of 0.05 h2o, 0.05 h2o, 0.0 h2o and high limits of 0.60 h2o, 0.25 h2o and 0.20 h2o, respectively.

5. A heating, ventilating and cooling (HVAC) system, comprising:
   an economizer having a damper and an actuator to move blades thereof;
   a pressure sensor configured to determine a pressure difference across said damper; and
   a diagnostics controller having a program stored thereon configured to:
      use pressure difference sensor data and damper position data of said economizer to determine if said pressure difference across said economizer is outside an operational design parameter of said HVAC system, wherein said operational design parameter is a function of a damper position of said economizer, and
      generate an error signal indicating a return restriction problem when said pressure difference is outside said operational design parameter and said damper position is lower than a predetermined position, wherein said error signal specifies which one or more of the following conditions caused the return restriction problem: a duct restriction, an incorrect damper position, or a pressure sensor malfunction;

wherein said diagnostics controller is configured with a stored diagnostics data table relating said pressure difference sensor data with said damper position data, and wherein said diagnostics controller is configured to:

check pressure differences across said economizer at different damper positions during a continuous operation of said HAVC system ; and use a persistence criterion routine to ensure that a fault persists before triggering said error signal during said continuous operation.

6. The HAC system recited in claim 5, wherein said damper position data is based on a blade angle data of said economizer.

7. The HVAC system recited in claim 6, wherein said HVAC system further comprises a ventilation director associated with said actuator and said diagnostics controller is configured to receive said damper position data from said ventilation director.

8. The HVAC system recited in claim 5, wherein said diagnostics controller is configured to check pressure differences across said economizer at different damper positions during a calibration period of said HVAC system, based on said stored diagnostics data table.

9. The HVAC system recited in claim 5, wherein said stored diagnostics data table relates a damper position of 0%, 50%, and 100% to low limits of 0.05 h2o, 0.05 h2o, 0.0 h2o and high limits of 0.60 h2o, 0.25 h2o and 0.20 h2o, respectively.

* * * * *

UNITED STATES PATENT AND TRADEMARK OFFICE
CERTIFICATE OF CORRECTION

PATENT NO. : 10,061,330 B2
APPLICATION NO. : 13/919590
DATED : August 28, 2018
INVENTOR(S) : Jonathan Douglas and Herman M. Thomas Page 1 of 1

It is certified that error appears in the above-identified patent and that said Letters Patent is hereby corrected as shown below:

In the Claims

Column 10, Line 24, delete "differences" and insert --difference--.

Column 10, Line 35, after "controller", insert --recited--.

Column 11, Line 14, after "The" delete "HAC" and insert --HVAC--.

Signed and Sealed this
Seventeenth Day of September, 2019

Andrei Iancu
*Director of the United States Patent and Trademark Office*